(12) United States Patent
Halbach et al.

(10) Patent No.: US 6,422,763 B1
(45) Date of Patent: Jul. 23, 2002

(54) FIBER OPTIC CABLE FOR CONNECTION TO A MATING CONNECTOR

(75) Inventors: Paul Gerhard Halbach, Wuppertal (DE); Edward M. Bungo, Cortland; William T Madden, Solon, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/564,995

(22) Filed: May 4, 2000

(51) Int. Cl.[7] .................................................. G02B 6/36
(52) U.S. Cl. .......................................... 385/77; 439/157
(58) Field of Search .............................. 385/76, 77, 58, 385/59; 439/157, 144, 138, 142

(56) References Cited

U.S. PATENT DOCUMENTS

| | | | | |
|---|---|---|---|---|
| 4,245,875 A | * | 1/1981 | Shaffer et al. | ............... 439/144 |
| 4,779,950 A | * | 10/1988 | Williams | ...................... 385/58 |
| 5,401,179 A | * | 3/1995 | Shinchi et al. | .............. 439/157 |
| 5,709,560 A | * | 1/1998 | Hio | ............................. 439/157 |

FOREIGN PATENT DOCUMENTS

| | | |
|---|---|---|
| DE | 4229511 C2 | 3/1994 |
| DE | 4415631 A1 | 11/1994 |
| EP | 570652 B1 | 4/1996 |

* cited by examiner

Primary Examiner—Tulsidas Patel
(74) Attorney, Agent, or Firm—Thomas N. Twomey

(57) ABSTRACT

An end fitting for a fiber optic cable for connection to a mating connector, said end fitting comprising a connector body surrounding an end of at least one fiber optic cable and an element movable relative to said connector body from the first position covering an end of said at least one fiber optic cable to a second position in which said end of said fiber optic cable is aligned with said mating connector and in which said movable element prevents separation of said end fitting and said mating connector.

22 Claims, 4 Drawing Sheets

FIBER OPTIC CABLE FOR CONNECTION TO A MATING CONNECTOR

TECHNICAL FIELD

The present invention relates to an end fitting for a fiber optic cable for connection to a mating connector.

BACKGROUND OF THE INVENTION

End fittings of this kind are required whenever a fiber optic cable has to be connected to a light source, to an end of another fiber optic cable or to an optical element or component to be illuminated. When the end of the optical cable is free, for example either because it is not in use or while it is waiting for connection to a mating connector, there is a need to protect the end of the fiber optic cable. This can, for example, be necessary to prevent the end of the fiber optic cable becoming contaminated and thus attenuating the light passing through it. In some systems it can also be necessary in order to prevent injury to the human eye by light emerging from the end of the fiber optic cable.

Various systems are known for such purposes in the prior art. For example German patent specification 42 29 511 C2 discloses a cover for plug connectors for light wave guides. A lug is provided in a mating connector which obscures the light emerging from a light outlet opening. On insertion of the male connector into the mating connector, which is realized as a socket, the lug is bent out of the way so that light from the light source can then be transmitted into the fiber optic cable in the male connector.

In German laying open print DE 44 15 631 a cap member is provided for placement over the end of a connector having two connection sleeves so that the connection sleeves and thus the fiber optic cable ends present within them are protected.

Finally, European patent 0 570 652 B1 discloses a plug connection for optical fibers-comprising at least one plug pin and a socket member for receiving the plug pin with a protective cap being arranged on the plug pin and being movable from a closed position with the end of the optical fibers covered into an open position with the end exposed. In EP 0 570 652 B1 separate means are provided for latching the plug and socket connectors together. In European patent 0 570 652 B2 the overall arrangement is very complicated and thus costly to produce.

SUMMARY OF THE INVENTION

It is a principle object of the present invention to provide an end fitting for a fiber optic cable which on the one hand provides protection for the free end of the fiber optic cable when not in use or during assembly and which on the other hand serves a useful purpose after connection of said end fitting to a mating connector.

It is a further object of the present invention to provide an end fitting for a fiber optic cable which has an element protecting the end of a fiber optic cable and which is of simple design, with the element being easy to remove.

It is a yet further object of the present invention to provide a cost-effective and simple end fitting for a fiber optic cable which not only protects the free end of a fiber optic cable prior to installation but also facilitates a connection to a mating connector and secures the completed connection.

In order to satisfy this object there is provided, in accordance with a first embodiment of the invention an end fitting for a fiber optic cable for connection to a mating connector, said end fitting comprising a connector body surrounding an end of at least one fiber optic cable and an element movable relative to said connector body from a first position covering an end of said at least one fiber optic cable to a second position in which said end of said fiber optic cable is aligned with said mating connector and in which said movable element prevents separation of said end fitting and said mating connector.

According to a further aspect of the present invention there is provided a fiber optic end fitting for connection to a mating connector, said end fitting comprising a connector body at least partly surrounding an end of at least one fiber optic cable terminating at a ferrule, a lever, means pivotally mounting said lever on said connector body, said lever having a portion forming a protective cap positioned in front of said ferrule in a first protective position of said lever, at least one guide projection present on one of said lever and said mating connector for entry into a cooperating guide recess on the other one of said mating connector and lever during engagement movement of said end fitting towards said mating connector and cooperating with said guide projection to produce pivotal movement of said guide lever during said movement to expose said ferrule to said mating connector and to move said lever into a locked position in which it prevents disengagement movement of said fiber optic end fitting and mating connector.

Thus, in accordance with the present invention the element or lever provided on the connector body serves, in a first position, to cover over the fiber optic cable, thus protecting it against contamination and protecting users against light emanating from the end of the fiber optic cable. Furthermore, after engagement of the end fitting with a mating connector, the element or lever serves to lock the connections. Thus, the same component is used for two quite distinct functions and results in a particularly simple design, since the number of individual parts required is comparatively small.

It is particularly convenient if the element or the lever is pivotally connected to the connector body since this can be achieved with simple projections provided on the connector body or on the element or lever which engage into corresponding recesses in the other component, i.e. in the element or lever or in the connector body. Such projections and recesses can readily be manufactured by injection moulding processes in a manner well understood in the art of plastic injection moulding. Thus the element or lever can be pivoted from a first position in which it covers over the end of the fiber optic cable into a second position in which it cooperates with the mating connector to lock the end fitting to the mating connector. The lever element is also preferably locked to the connector body in the first position so that the part of the lever or element coupling over the end of the fiber optic cable cannot be accidentally displaced to expose the end of the fiber optic cable.

The element or lever is preferably substantially U-shaped and has a base portion and first and second limbs as well as pivot means disposed between said limbs and said connector body, with the pivot means defining a pivot axis for said element or lever. This embodiment is particularly favorable, since the element or lever and the pivot means are of simple shape and can readily be realized by injection molding.

In a particularly preferred embodiment of the present invention the end fitting further comprises at least one guide feature provided at least one of said first and second limbs, a further guide feature provided at said mating connector, said guide feature and said further guide feature cooperating to move said element from said first position to said second position during engagement movement of said end fitting relative to said mating connector.

More particularly the mating connector preferably comprises a socket having a pair of opposed side walls spaced apart to receive at least a portion of said first and second limbs, and wherein said first guide feature comprises respective outwardly projecting projections on said first and second limbs and wherein said first guide feature comprises guide tracks provided in said opposed said walls and cooperating with said outwardly projecting projections, or vice versa.

The use of elements such as projections and guide tracks provide a simple cost-effective and nevertheless efficient way of providing the locked connection of the present invention.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
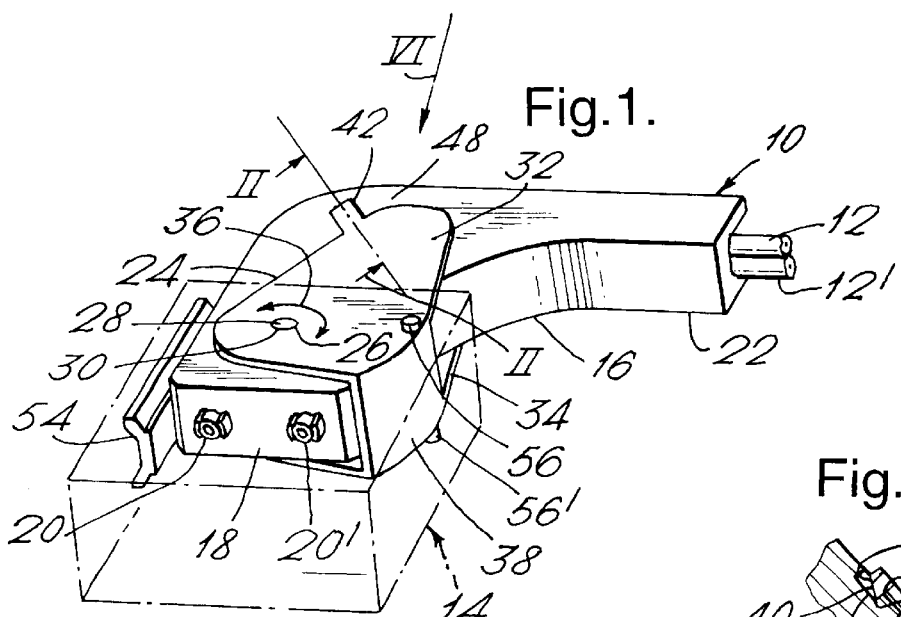
FIG. 1 is a perspective view of an end fitting engaged within an only schematically illustrated mating connector.

Turning now to FIG. 1 there can be seen an end fitting 10 for a fiber optic cable comprising in this case two separate fiber optic cables 12. The end fitting 10 is shown in the state it adopts after engagement with a mating connector 14; which is only shown schematically in FIG. 1. The end fitting comprises a connector body 16 into which the two fiber optic cables 12 are laid with the fiber optic cables terminating at an end face 18 of the connector body 16 at respective ferrules 20, 20'. These ferrules 20, 20' and the ends of the optical cables 12, 12' disposed centrally within them are typically injection moulded into the connector body 16. The tail portion 22 of the connector body provides a support for the two fiber optic leads 12, 12' and a gradual change in stiffness so as to avoid kinking of the optic cables 12, 12'.

Provided on the connector body 16 is a generally U-shaped element, configured as a U-shaped lever 24, which is pivotally connected to the connector body 16 at 26. More specifically the connector body 16 has at the top and at the bottom (not shown) respective, cylindrical posts 28 which engage in respective cylindrical bores 30 in the respective first and second, upper and lower limbs 32 and 34 of the lever 24. The lever 24 can thus be pivoted in the direction of the double arrow 36 about the pivot axis defined by the cylindrical posts 28 engaging in the cylindrical bores 30 (only one shown). In the position of the lever 24 shown in FIG. 1 the base portion 38 which interconnects the two limbs 32 and 34 is provided to the right of the two ferrules 20, 20' so that these are exposed and are able to communicate with the mating parts provided in the mating connector 14.

Figure 2:
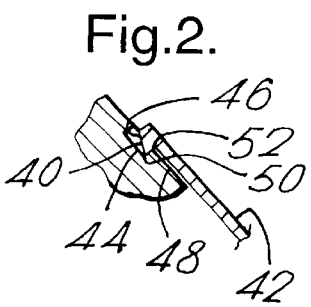
FIG. 2 is a cross-sectional representation in accordance with the arrow II—II in FIG. 1 of a locking member present on a lever of the end fitting of FIG. 1.

The lever 24 is retained in the position shown in FIG. 1 by the engagement of a lock member 40 provided on a tongue 42 of the limb 32. The lock member 40 engages in a recess 44 in the connector body 16. It can be seen from the drawing of FIG. 2 that the lock member 40 has an inclined surface 46 which, during movement of the lever 24 in the counter-clockwise direction around the post 28, slightly deflects the limb 32 against its inherent resilience so that the lock member can ride over the upper surface 48 of the mating connector body. As soon as the apex of the ramp has past over the edge 50 of the recess 40 the resilience of the limb 32 presses the lock member 40 into the recess and the cooperating surfaces 52 and 50 lock the lever 24 in the position shown in FIG. 1. It should be emphasized that a tongue 42 with a corresponding lock member 40 is normally provided on both limbs 32 and 34 of the lever 24 and indeed the second tongue 42' can be seen on the lower limb 34 in FIG. 3. This second tongue 42' also carries a lock member 40' which cooperates with a corresponding recess 44' (FIG. 5) in the bottom side of the connector body 16. Also apparent in FIG. 1 is a guide rail 54 provided on the left side of the connector body 16 and two cylindrical projections 56 and 56' provided on the first and second limbs 32 and 34 of the lever 24.

Figure 3:
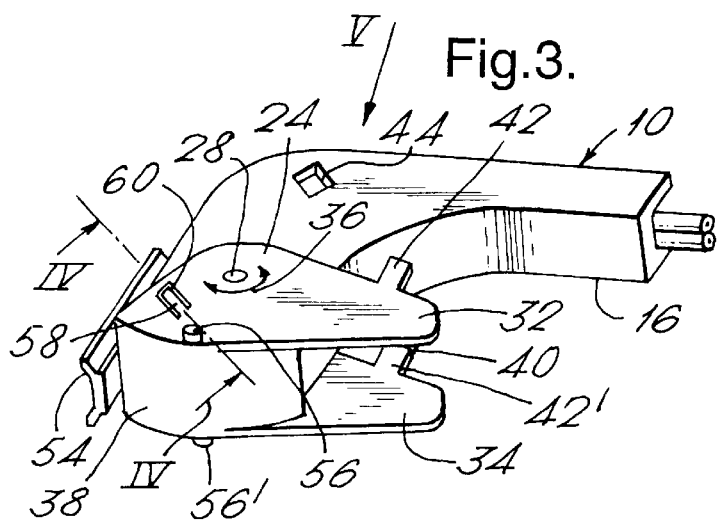
FIG. 3 is a perspective view of the same end fitting as in FIG. 1 but with a lever thereof in a first position in which it covers over the end of a fiber optic cable.
Figure 4:
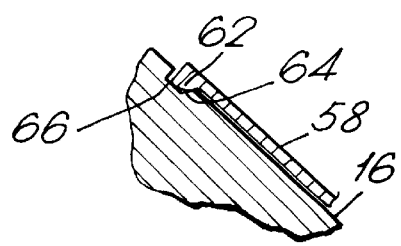
FIG. 4 is a schematic cross-section in accordance with the section lines IV—IV in FIG. 3 illustrating the latching of a lever of the end fitting to a connector body of the end fitting in the position protecting the ends of the fiber optic cables.

FIG. 3 shows the end fitting 10 of FIG. 1 with the lever 24 in a first closed position in which the base portion 38 covers over the two ferrules 20, 20' and the free ends of the fiber optic cables 12, 12'. FIG. 3 also shows at 58 a latch member which is not shown in the drawing of FIG. 1 but which is present there. This is simply omitted from the drawing of FIG. 1 to simplify the illustration. This latch member 58 serves to latch the lever 24 in the first closed position of FIG. 3 and is similarly designed to latch the tongue 42 but is not identical thereto. First of all the latch tongue 58 is defined by a U-shaped cut-out 60 within the limb 32. Secondly the latch member 62 at the end of the tongue 58 is provided with a ramp 64 facing in the opposite direction to the ramp 40 of FIG. 2. The reason for this is that the lever 24 has to be capable of being moved in the anti-clockwise direction about the pivot axis defined by the cylindrical post 28 in order to move it into engagement with the connector body 16. Thus the latch member 62 of FIG. 4 is latched into a recess 66 in the connector body 16 but can be lifted out of the recess by the ramp 64 sliding up the corresponding ramp surface of the recess 66 when the lever 24 is moved clockwise about the post 28. Again a second tongue 58' (FIG. 5) is provided on the limb 34 beneath thy connector body 16.

Figure 5:
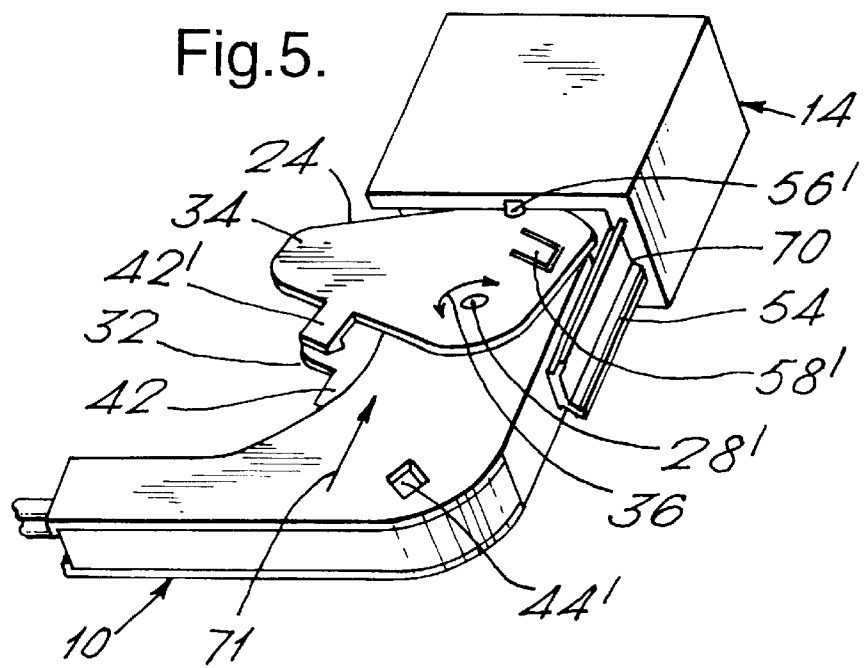
FIG. 5 is a perspective view of the end fitting in the state of FIG. 3 as seen generally from the rear in the direction of the arrow V in FIG. 3 at the start of insertion into a mating connector.
Figure 6:
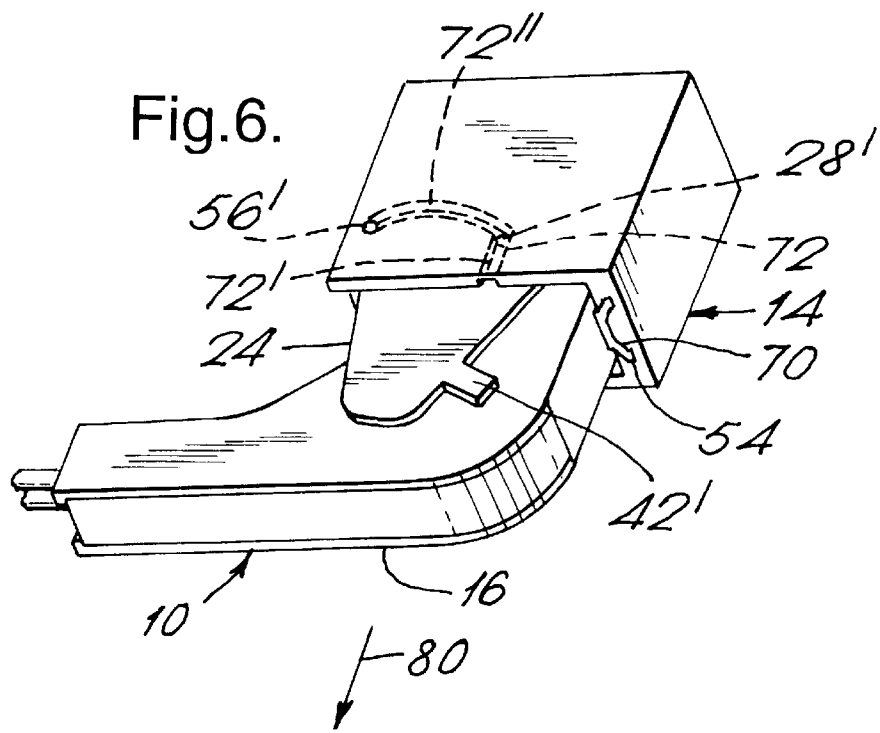
FIG. 6 is a view similar to FIG. 5 but with the end fitting fully engaged with the mating connector, i.e. in the position corresponding to that shown in FIG. 1 but again shown from the rear in the direction of the arrow VI in FIG. 1.

Turning now to FIGS. 5 and 6 the method of operation of the end fitting 10 of FIGS. 1 to 4 during connection to the mating connector 14 can be seen. In FIG. 5 the end fitting 10 has been inverted relative to FIG. 1, so that the limb 34 with the tongue 42' is at the top. The guide rail 54 is provided with its leading end just engaging with the mating guide 70 of the mating connector 14. The cylindrical post 56' is located directly at the entrance of the guide groove 72 which cannot readily be seen in FIG. 5 but is shown in FIG. 6 where the top surface of the mating connector 14 has been removed so that the full shape of the guide recess 72 can be seen.

It is apparent from FIG. 5 that an imaginary line connecting the cylindrical post 56' with the cylindrical post 28' extends substantially parallel to the linear guide 54 so that the initial movement of the end fitting 10 into the mating connector 14 does not result in any rotation of the lever 24. Thus, the initial insertion movement in the direction of the arrow 71 is determined by the length of the straight portion 72' of the guide track 72 in FIG. 6. During this initial insertion movement, the ferrules and the ends of the optical cables 12, 12' are still covered over by the base portion 38 of the lever 24. However, once the cylindrical post 56' reaches the end of the straight portion 72', where it merges into the arcuate portion 72" in FIG. 6, the post 56' is forced to move to the left along this arcuate guide track 72" so that further insertion movement of the end fitting 10 into the mating connector 14 produces rotation of the lever 24 from the first position shown in FIGS. 3 and 5 to the open position shown in FIGS. 1 and 6 in which it is locked to the connector body 16 via the engagement of the lock members 42, 42' into the respective recesses 44, 44'. The post 56 on the limb 32 of the lever 24 engages in a guide track of the same profile in the bottom wall of the mating connector 14 shown in FIGS. 5 and 6.

After the end fitting 10 has been moved into the mating connector 14 by the amount corresponding to the length of the straight portions 72' of the guide track the rotation produced in the anti-clockwise direction about the posts 28, 28' generates a force sufficient to lift the resilient tongues 58, 58' out of the respective recesses 66, 66' due to the cooperation of the inclined surface of the latch member 62 with respective ramps such as 64 so that the full pivotal movement of the lever can take place. In the closed position in which the end fitting 10 is fully engaged with the mating connector 14, in which the linear guide 54 is fully engaged in the corresponding guide recess 70 of the mating connector 14, the posts 56 and 56' have reached the ends of the arcuate track portion 72" and can move no further. Moreover, due to the engagement of the lock members 52, 52' in the corresponding recesses 44, 44' the lever 24 is now locked to the connector body 16. If someone tries to pull the end fining 10 in the direction of the arrow 80 out of the mating unit 14 then this is not possible because the posts 56, 56' abut against the ends of the corresponding arcuate track 72" and cannot be extracted from the mating connector 14. Moreover the posts 56, 56' cannot simply move back along the arcuate track 72" because the lever 24 is locked to the connector body 16 by the lock members 52, 52'. The only way the connection between the end fitting 10 and the mating connector 14 can be disengaged is for the lock members 52, 52' to be levered out of their respective lock recesses 44, 44' using a suitable tool and for the lever 24 to be given an initial clockwise rotation in FIG. 6 about the pivot axis defined by the posts 28, 28'. Subsequent pulling on the end fitting 10 in the direction of the arrow 80 will then enable the posts 56, 56' to move back along the arcuate track 72" and subsequently slide out of the straight portion 72' of the guide track 74. It will be appreciated that in the engaged position of FIG. 6 with the lever 24 in the position shown in FIG. 1 the ferrules 20, 20' mate with corresponding elements in the mating connector 14 so that, for example, light emitting diodes present in the mating connector 14 at the position of the ferrules 20, 20' can direct light into the fiber optic cables 12, 12'.

After extraction of the end fitting 10 out of the mating connector 14 the lever 24 has been swung back into the closed position of FIG. 3 and is held in this closed position by the cooperation of the latch members 62 with the latch recesses 66 in the connector body 16.

It should be emphasized, that although fiber optic cables 12, 12' have been shown in the embodiment of FIGS. 1 to 6 the embodiment can be equally used with one fiber optic cable or with other numbers of fiber optic cables without restriction. It should also be noted that the mating connector 14 can be a header, i.e. a type of mating connector, which is normally fixed to a rail, panel or other member in a specific piece of apparatus, for example in a motor car.

Figure 7:
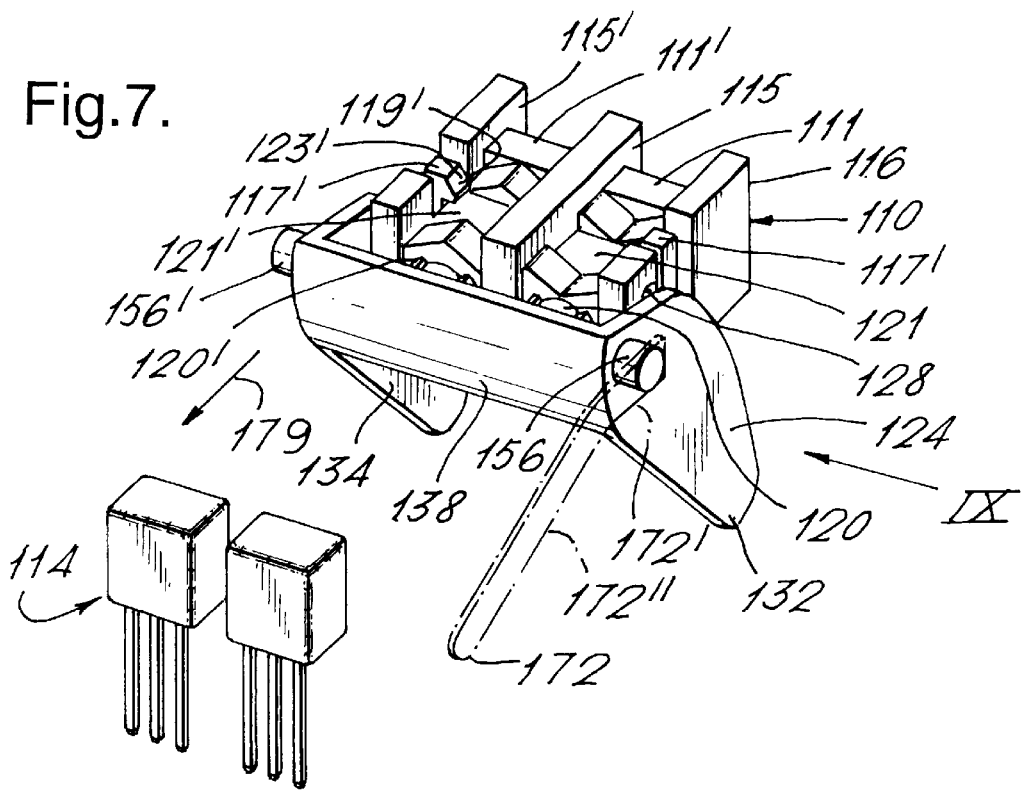
FIG. 7 is a perspective view of an alternative end fitting to that shown in FIG. 1 but based on the same general operating principle, the end fitting being shown in the open position immediately prior to engagement with the mating connector, which is however only shown schematically for the sake of clarity.
Figure 8:
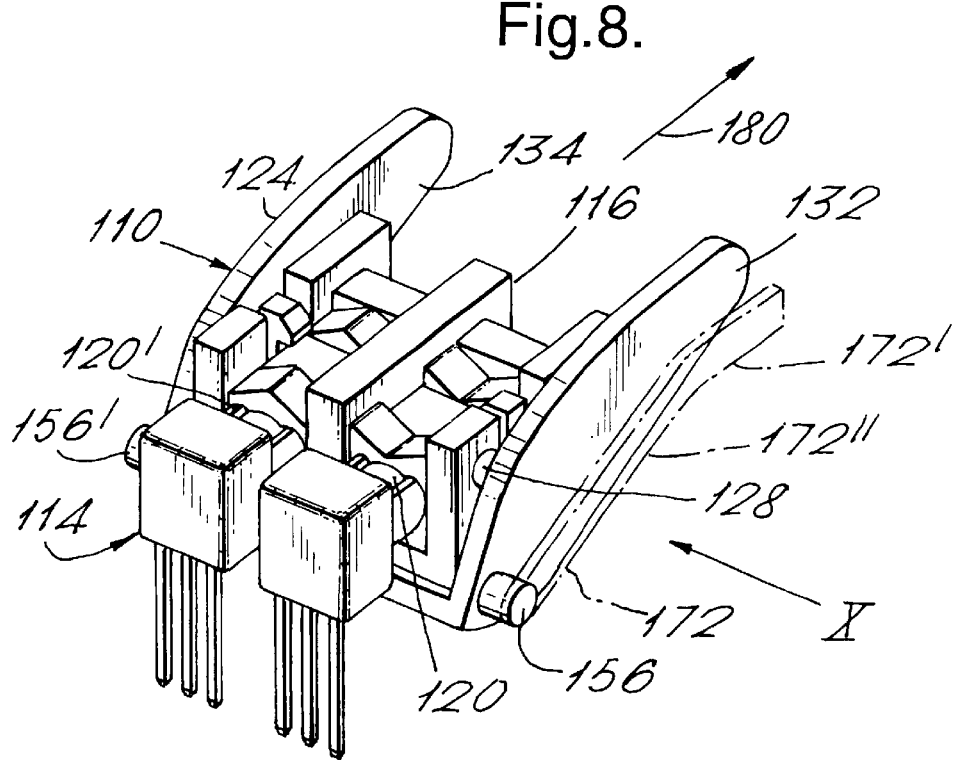
FIG. 8 is the end fitting of FIG. 6 in the engaged position with the mating connector, which is again only shown schematically.
Figure 9:
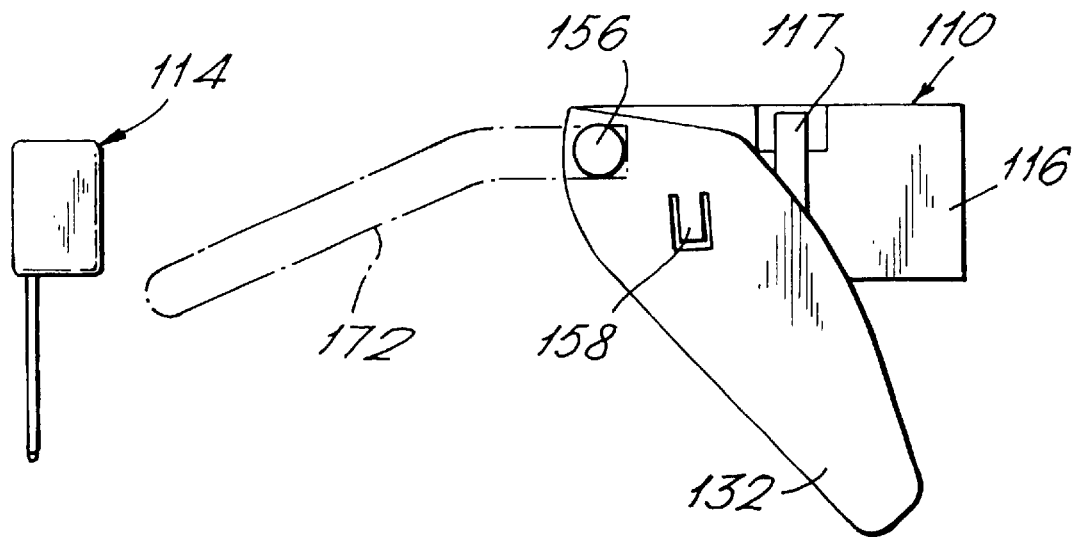
FIG. 9 is a side view of the end fitting of FIG. 7 seen in the direction of the arrow IX in FIG. 7
Figure 10:
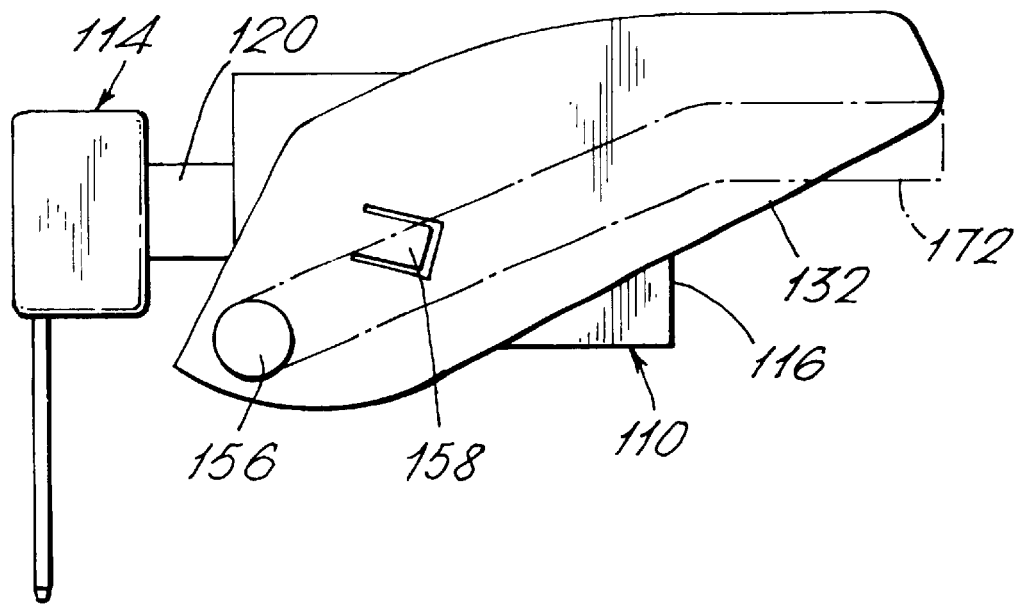
FIG. 10 is a side view of the completed assembly of FIG. 8 as seen in the direction X of FIG. 8.

Turning now to FIGS. 7 to 9 there can be seen an alternative embodiment of the present invention which operates generally on the same lines as the embodiment of FIGS. 1 to 6 but which is configured differently.

For the sake of simplicity of disclosure the same reference numerals are basically used as are used in connection with FIGS. 1 to 6 but are increased by 100. It will be appreciated that the description given for any element present in FIGS. 1 to 6 applies to the corresponding element in the embodiment of FIGS. 7 to 10 unless something is stated to the contrary.

Thus, in FIG. 7 there can be seen an end fitting 110 which is also used with two fiber optic cables which are not shown per se but each of which terminates in an end block 111 and 111'. The end blocks 111 and 111' are accommodated in respective U-shaped channels 115 and 115' of a connector body 116 which is generally of W-shape with one such channel 115, 115' being formed in each recess of the W. The connector body 116 is a unitary moulding and includes two latching levers 117, 117' which have respective latching heads such as 119 which latch over respective recesses 121' and 121 of the end blocks 111 and 111'. It can be seen from the latch head 119' that it has a sloping surface 123' which facilitates the insertion of the respective end block 111' which can be simply pushed downwardly into the respective recess 115' of the W-shaped connecting member 116, thus pushing the latch member 117' to the left in FIG. 7, until, when fully seated in the recess 115', the latch head 119' snaps into position above the recess 121' thus securing the connections The situation with the end block 111 is precisely the same.

Pivotally mounted on the connector body 116 is a U-shaped lever 124 having a base portion 138 and first and second limbs 132 and 134. A pivotal connection between the U-shaped member 124 and the connector body 116 takes place via respective peg or post members such as 128 of which only one can be seen in FIGS. 7 and 8. There is however a second cylindrical post member 128 provided at the limb 134. In this case the posts 128 are provided on the respective limbs 132 and 134 and engage in cylindrical recesses in the external walls of the connector body 116.

In the diagram of FIG. 7 the mating connector is only very schematically illustrated at 114 and it includes a guide track 172 into which cylindrical posts 156 and 156' provided on the lever 124 engaged. In actual fact FIG. 7 and the other Figures show only one guide track 172 it will be understood that there is a second guide track of the like design in the mating connector 114 for the cylindrical post 156'. Again the guide track has an initial straight portion 172' and then an inclined portion 172". During engagement movement of the connector body 116 and the mating connector 114 in the direction of the arrow 179 the guide track 172 causes, as a result of cooperation with the post members 156, 156', the lever 124 to swing from the first closed position in FIG. 7 into the second open position shown in FIG. 8 in which the ferrules 120 and 120' now cooperate with the mating elements in the mating component 114.

Although not readily seen in FIGS. 7 to 10 latch elements are provided on the side cheeks of the connector body 116 and engage in two corresponding recesses in the inner sides of two limbs 132 and 134. Thus, in the embodiment of FIGS. 7 and 8 the U-shaped lever 124 is locked to the connector body 116 in the closed position and again the arrangement is such that in the closed position, shown in FIG. 8, this engagement movement of the end fitting 110 away from the mating connector 114 is again not possible because the cylindrical posts 156 are prevented from moving by the geometry of the track 172. In order to produce disengagement movement in the direction of the arrow 180 the levers 132, 134 must first be spread apart slightly to disengage the locked connection at the connector body 116 and can then be pivoted back to the initial position of FIG. 7 as the cylindrical posts 156, 156' slide along the respective guide tracks such as 172.

Also not shown in the embodiment of FIGS. 7 to 10 is a latch member for retaining the lever 124 in the first, closed position shown in FIG. 7, in which it covers over the front ends of the ferrules 120, 120'. However suitable latching features can be provided if desired. A possible arrangement is shown at 158 in FIG. 9.

Finally, it should be noted that the present invention can also be applied to inverse arrangements in which the mating connector is realised as a connector body surrounding an optical component and carries an element movable relative to it. In similar manner to the examples discussed earlier the element is movable relative to the connector body from a first position covering an end of the optical component to a second position, in which the optical component is aligned with an end of a fiber optic cable supported in an end fitting, the end fitting being connected to the mating connector. The optical component can, for example, be a light-emitting diode or a laser diode or a lens, or indeed an optical cable. In this inverse arrangement the movable element is then adapted to prevent separation of the mating connector and the end fitting. This embodiment can, for example, be readily understood if, for example with reference to FIG. 6, the mating connector 14 is thought of as supporting the two optical cables and then forms the end fitting of the optical cables, while the previous end fitting 10 now forms the mating connector or header to which the end fitting 14 is to be attached. In this case, the movable element 24 is provided on the header or mating connector rather than on the end fitting of the optical fiber cable. Expressed differently, the end fitting of the optical fiber cable would then be a socket member while the mating connector would be a male fitting engageable within the socket-type end fitting on the optical fiber cable. Clearly, the embodiment of FIGS. 7 to 10 can also be functionally inverted in the same manner.

What is claimed is:

1. An end fitting for a fiber optic cable for connection to a mating connector, said end fitting comprising a connector body surrounding an end of at least one fiber optic cable and an element movable relative to said connector body from a first position covering an end of said at least one fiber optic cable to a second position in which said end of said fiber optic cable is aligned with said mating connector and in which said movable element prevents separation of said end fitting and said mating connector;

wherein means is provided for movably guiding said element on said connector body; and wherein said element is substantially U-shaped and has a base portion and first and second limbs, wherein said means for movably guiding said element comprises a pivot means disposed between said limbs and said connector body and defining a pivot axis for said element; and further comprising at least one guide feature provided at at least one of said first and second limbs, a further guide feature provided at said mating connector, said guide feature and said further guide feature cooperating to move said element from said first position to said second position during engagement movement of said end fitting relative to said mating connector.

2. An end fitting in accordance with claim 1, wherein said base portion of said element covers over said end of said at least one fiber optic cable in said first position.

3. An end fitting in accordance with claim 1, wherein means is provided for locking said element to said connector body in said second position.

4. An end fitting in accordance with claim 1, wherein means is provided for locking said element to said connector body in said first position.

5. An end fitting in accordance with claim 1, wherein said mating connector comprises a socket having a pair of opposed side walls spaced apart to receive at least a portion of said first and second limbs, and wherein said first guide feature comprises respective outwardly projecting projections on said first and second limbs and wherein said further guide feature comprises guide tracks provided in said opposed said walls and cooperating with said outwardly projecting projections, or vice versa.

6. An end fitting in accordance with claim 5, wherein means is provided for locking said element to said connector body in said second position.

7. An end fitting in accordance with claim 6, wherein said projections are spaced from said pivot axis and said guide tracks are profiled to permit rotation of said element about said pivot axis during relative engaging movement of said connector body into said mating connector until said element is locked to said connector body, said cooperating projections and guide tracks preventing the separating movement of said end fitting and said mating connector when said element is locked to said connector body.

8. An end fitting in accordance with claim 6, wherein said locking means comprises at least one resiliently supported projection on one of said element and said connector body and cooperating with a projection receiving recess on the other one of said connector body and said element.

9. An end fitting in accordance with claim 8, wherein a said resiliently supported projection is provided on each of said first and second limbs.

10. An end fitting in accordance with claim 9, wherein said connector body has first and second recesses for receiving said resiliently supported projections on said first and second limbs.

11. An end fitting in accordance with claim 9, wherein said first and second limbs are resilient thereby resiliently supporting said projections.

12. An end fitting in accordance with claim 1, wherein cooperating linear guide means are provided on said connector body and on said mating connector for guiding said connector body relative to said mating connector during mating engagement therewith.

13. An end fitting in accordance with claim 5, wherein means is provided on at least one of said first and second limbs for locking said element to said connector body and said first position.

14. An end fitting in accordance with claim 13, wherein said means provided on at least one of said first and second limbs comprises a resilient tongue element of a respective one of said first and second limbs, said resilient tongue carrying a latch member engageable into and releasable from a latch recess in said connector body.

15. An end fitting in accordance with claim 1, wherein said mating connector comprises a header.

16. A fiber optic end fitting for connection to a mating connector, said end fitting comprising a connector body at least partly surrounding an end of at least one fiber optic cable terminating at a ferrule, a lever, means pivotally mounting said lever on said connector body, said lever having a portion forming a protective cap positioned in front of said ferrule in a first protective position of said lever, at least one guide projection present on one of said lever and said mating connector for entry into a cooperating guide recess on the other one of said mating connector and lever during engagement movement of said end fitting towards said mating connector and cooperating with said guide projection to produce pivotal movement of said guide lever during said movement to expose said ferrule to said mating connector and to move said lever into a locked position in which it prevents disengagement movement of said fiber optic end fitting and mating connector.

17. A fiber optic end fitting in accordance with claim 16, and further comprising a lock member mounted on said lever and engageable in said locked position of said lever in a recess of said connector body.

18. A fiber optic end fitting in accordance with claim 16, and further comprising a lock member mounted on said connector body and engageable in said locked position of said lever in a recess of said lever.

19. A fiber optic end fitting in accordance with claim 16, and further comprising a latch member mounted on said lever and engageable in said first position into a corresponding recess of said connector body.

20. A fiber optic end fitting in accordance with claim 16, and further comprising a latch member mounted on said connector body and engageable in said first position of said lever into a corresponding recess of said lever.

21. A fiber optic end fitting in accordance with claim 16, in combination with a mating connector, said mating connector being a header.

22. An end fitting for a fiber optic cable for connection to a mating connector, said end fitting comprising a connector body surrounding an end of at least one fiber optic cable and an element movable relative to said connector body from a first position covering an end of said at least one fiber optic cable to a second position in which said end of said fiber optic cable is aligned with said mating connector and in which said movable element prevents separation of said end fitting and said mating connector;

wherein means is provided for locking said element to said connector body in said second position; and
wherein means is provided for locking said element to said connector body in said first position.

* * * * *